United States Patent
Duha et al.

(10) Patent No.: US 7,284,856 B2
(45) Date of Patent: Oct. 23, 2007

(54) METHOD FOR DESIGNING COLOR FILTERS WHICH IMPROVE OR MODIFY COLOR VISION OF HUMAN EYE, AND COLOR FILTER MEANS DESIGNED BY THE METHOD

(76) Inventors: Tibor Duha, Orom U. 4., H-1016 Budapest (HU); György Szalai, Krisztina krt. 9., H-1122 Budapest (HU); Katalin née Horváth Fluck, Eper U. 20., H-1112 Budapest (HU)

( * ) Notice: Subject to any disclaimer, the term of this patent is extended or adjusted under 35 U.S.C. 154(b) by 769 days.

(21) Appl. No.: 10/432,809

(22) PCT Filed: Nov. 19, 2001

(86) PCT No.: PCT/HU01/00117

§ 371 (c)(1),
(2), (4) Date: Nov. 17, 2003

(87) PCT Pub. No.: WO02/42829

PCT Pub. Date: May 30, 2002

(65) Prior Publication Data

US 2004/0075810 A1     Apr. 22, 2004

(30) Foreign Application Priority Data

Nov. 24, 2000 (HU) .................................. 0004712

(51) Int. Cl.
G02C 7/10 (2006.01)
(52) U.S. Cl. ........................ 351/162; 351/163; 351/213
(58) Field of Classification Search ................ 351/162, 351/163, 160 R, 177, 44, 213, 219, 246; 636/6
See application file for complete search history.

(56) References Cited

U.S. PATENT DOCUMENTS

| 5,774,202 A | * | 6/1998 | Abraham et al. ............ 351/177 |
| 5,846,457 A | * | 12/1998 | Hoffman ...................... 264/2.1 |
| 6,149,270 A | * | 11/2000 | Hayashi ....................... 351/163 |

* cited by examiner

*Primary Examiner*—Hung Xuan Dang
(74) *Attorney, Agent, or Firm*—Janet Sleath; Speckman Law Group PLLC

(57) ABSTRACT

The invention relates to a method for designing color filters which improve or modify color vision of the human eye. According to the invention a desired opponent signal function to be attained is divided by a real opponent signal function characteristic of the eye color vision to be improved or modified, the negative range of the resulting function is replaced by zero, the whole function is normalized to give a spectral transmission function, and, if desired, one or more section(s) of this spectral transmission function is modified. The invention also relates to color filter means designed by the above method.

18 Claims, 13 Drawing Sheets

METHOD FOR DESIGNING COLOR FILTERS WHICH IMPROVE OR MODIFY COLOR VISION OF HUMAN EYE, AND COLOR FILTER MEANS DESIGNED BY THE METHOD

FIELD OF THE INVENTION

The invention relates to a method for designing color filters which improve or modify color vision of the human eye. The invention also relates to color filter means, which may be e.g. eyeglass lenses, contact lenses or intraocular lenses, designed by the method. The solution according to the invention can be applied primarily to improve the color vision of color deficients (i.e. people with parachromatism, who are also called in everyday language as color blinds); however, it can also be applied with good results in cases when the color vision of non color deficients should be modified.

BACKGROUND OF THE INVENTION

Color vision of human eye starts to proceed with the stimulation of photoreceptors (also termed as cones), which can be found on the retina and are sensitive in three different wavelength regions, i.e. in the long (l) middle (m) and short (5) regions (see Stockman, A., Sharper L. T.: "The Spectral Sensitivities of the Middle and Long Wavelength Sensitive Cones Derived from Measurements in Observers of Known Genotype"; Vision Research 40, 1711-1739 (2000)). The process continues by forwarding the signals of these cones first into bipolar and then into ganglion cells (Rodiech, R. W: "The First Steps in Seeing", p. 38-40 (Sinaver Associates, Inc., Massachusetts, USA, 1998)). The signals exiting the ganglion cells transport the chromatic information to the brain, where the further steps of color vision proceed.

The spectral sensitivities of the photoreceptors on the retina playa basic role in the appearance of parachromatism. Early attempts to correct parachromatism were based on the assumption that with color deficients some of the receptors are simply less sensitive than the normal ones, thus the sensitivities of the other receptors (with normal sensitivity) were lowered proportionally in order to try to recreate the correct ratios between the sensitivities of all of the receptors. Methods and means disclosed in published Hungarian patent application No. P9800510, in Canadian Patent No. 5,574, 517 and in U.S. Pat. Nos. 4,998,817, 5,574,517, 5,617,154, 5,369,453 and 5,846,457, furthermore the use of color filters which selectively transmit less light in the wavelength region where a specified receptor is sensitive can be regarded as such attempts for correction.

Some other methods based on the use of color filters aimed only at causing a certain increase in color contrast, without attempting to attain a real improvement of color vision (see e.g. the method disclosed in U.S. Pat. No. 6,089,712). Such color filters frequently even deteriorate the vision of colors, they enable, however, color deficients to see different colors in different brightnesses. With such filters the so-called pseudoisochromatic color vision tests (such as Ishihara, Velhagen and Dvorintests) can well be "decepted", without arriving at a real improvement in color vision.

Further investigations have shown that the basic reason for congenital color deficiency is that the spectral sensitivity functions (further on: SSF) of certain photoreceptors on the retina are shifted along the wavelength axis (Nathans, J.: The Genes for Color Vision; Scientific American pp. 35-38 {February, 1989)). This recognition well explains why the theory of decreased receptor sensitivity, which proved to be erroneous, could still remain for a prolonged period of time: namely if receptor sensitivity is measured only at a given wavelength, it may well occur that, just due to the shift, a part of SSF with lower sensitivity is observed.

The method disclosed in U.S. Pat. No. 5,774,202 makes use of the above recognition, wherein it has been also taken into account that the receptor SSFs may also be of incorrect shape, i.e. color deficiency is a result of SSFs with shifted position and/or of deformed shape. The principle of the method is that a color filter should be used, the spectral transmission function (a function where the percentage of transmitted light is plotted against the wavelength of the light for a given receptor type) of which corresponds to the quotient of SSF with correct shape and position to be attained and SSF with real (shifted) position and/or of deformed shape. This solution works well until the color filter has no adverse effects on other receptors with SSFs not to be corrected. This conflict is resolved so that the light transmission of the color filter is adjusted to the function calculated as discussed above only over a certain wavelength range, and the light transmission of the filter is maintained at a constant value at wavelengths outside of this range. The weak point of this solution resides just in this latter condition, since it is rather arbitrary to select the wavelength from which light transmission must remain unchanged.

All of the solutions discussed above intervene in the process of color vision from the side of receptors, i.e. from the input side. Although it has already been known (see e.g. pages 350-353 of Rodiech's textbook cited above) that a group of ganglion cells compares the signals of the l and m receptors and, as a result, transmits to the brain opponent signals which are proportional to (l−m), whereas a further group of ganglion cells compares the signals of the s receptors with the sum of l and m signals and, as a result, transmits to the brain opponent signals which are proportional to (s−(l+m)), no attempt was made to influence the intensity changes of the opponent signals as a function of the wavelength; i.e. feedback control from output side has not been applied before to correct color vision.

SUMMARY OF THE INVENTION

The invention is based on the recognition that the color vision of human eye can be improved or modified much more effectively than by the prior solutions if the spectral transmission function (further on: STF) of the color filter is designed not on the basis of the spectral sensitivity functions of the receptors, but either on the basis of the intensity of the opponent signal proportional to (l−m) plotted against the wavelength (further on: opponent signal function, $OP_1$) or on the basis of the intensity of opponent signal proportional to (s−(l+m)) plotted against the wavelength (further on: opponent signal function $OP_2$).

Thus, the invention relates to a method for designing spectral transmission function for a color filter which improves or modifies color vision of human eye. According to the invention a desired opponent signal function to be attained ($OP_1$, or $OP_2$) is divided by a real opponent signal function characteristic of the eye with color vision to be improved or modified ($OP_1'$ or $OP_2'$), the negative range of the resulting function is replaced by zero, and the whole function is normalized to give a spectral transmission function, and, if desired, a modified opponent signal function ($OP_1^*$ or $OP_2^*$) is generated from said spectral transmission function and from real spectral sensitivity functions of "m and s receptors of the eye with color vision to be improved or modified, and one or more section(s) of said spectral transmission function is modified over one or more wavelength range(s) by comparing, in one or more repetitions, said modified opponent signal function (OP$_1$* or OP$_2$*) with said desired opponent signal function to be attained (OP$_1$ or OP$_2$).

The invention also relates to optical means with color filter for improving or modifying color vision of human eye, wherein the color filter has a spectral transmission function designed as discussed above.

BRIEF DESCRIPTIONS OF THE DRAWINGS

The invention will be discussed now in more detail by the aid of the attached drawings, of which FIG. 1a shows the spectral sensitivity functions of l, m and s photoreceptors for a human eye with normal color vision (abscissa: wavelength ($\lambda$) in nm, ordinate: sensitivity in arbitrary units);

Figure 4A:
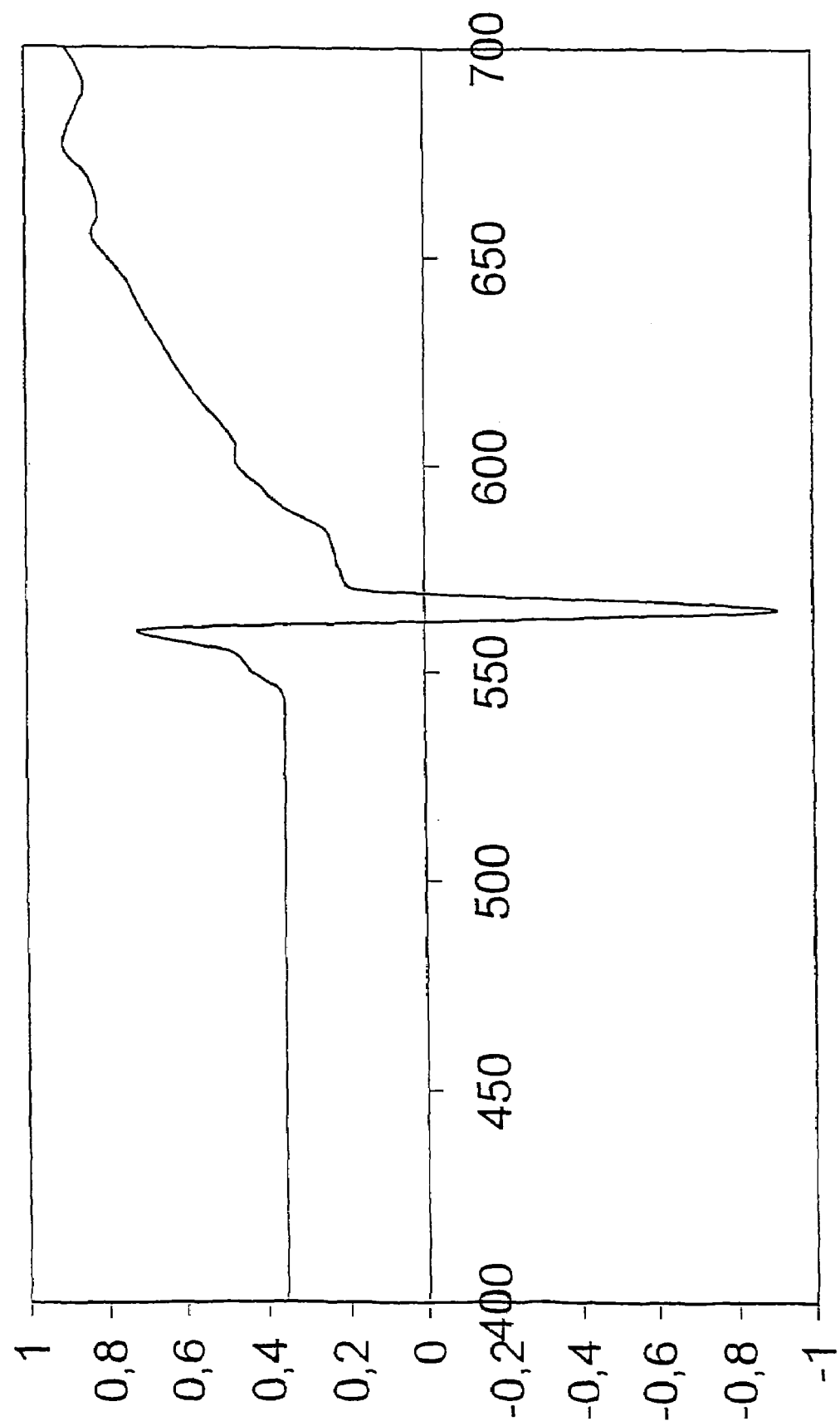
Figure 4B:
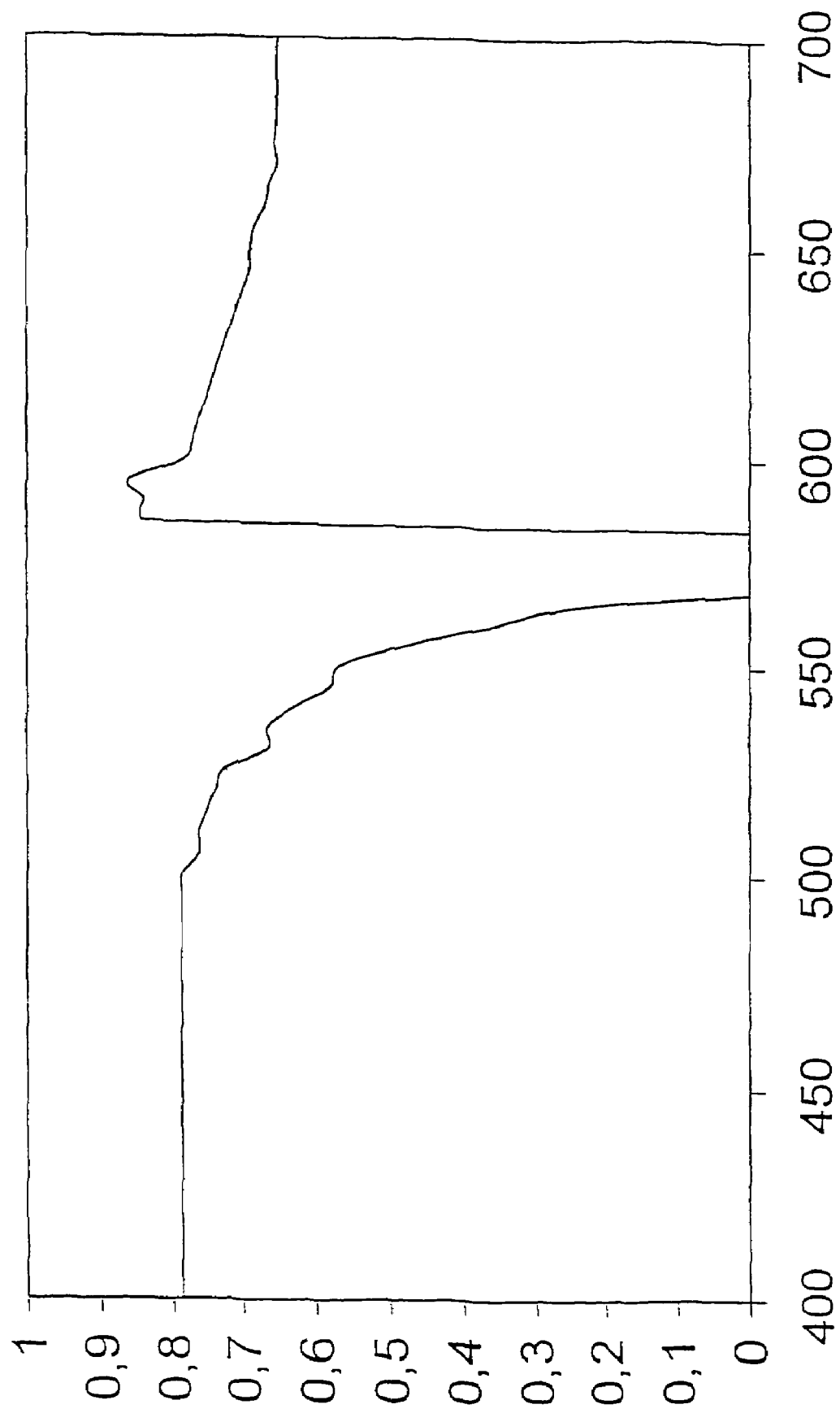

FIG. 4a shows the function obtained from the OP$_1$/OP$_1$' quotient for a color deficient patient with protanomaly, FIG. 4b shows the respective function for a color deficient patient with deuteranomaly. On both figures a function normalized to 0.9 was depicted in a slightly simplified manner; the negative range of the function has been omitted from FIG. 4b. Abscissa: $\lambda$ in nm, ordinate: intensity of light transmission.

Figure 5A:
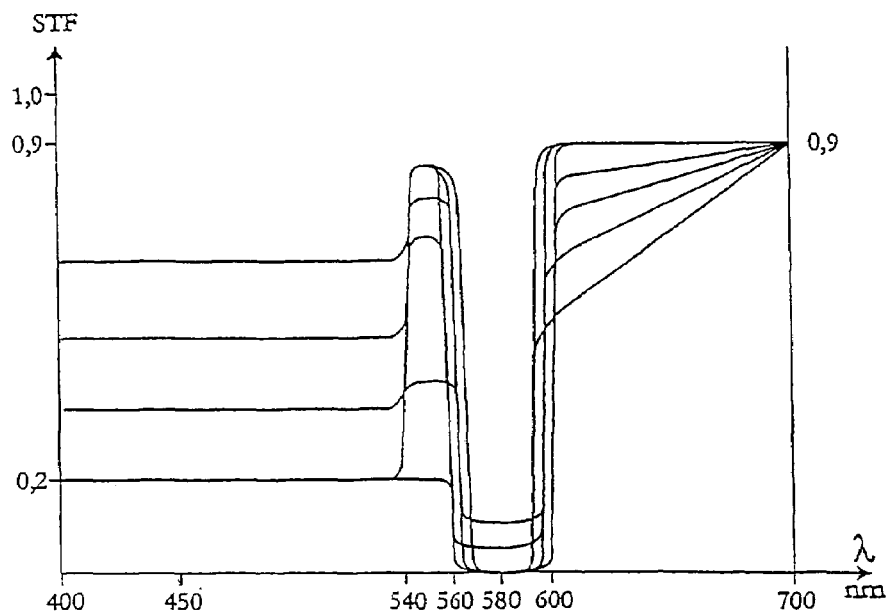
Figure 5B:
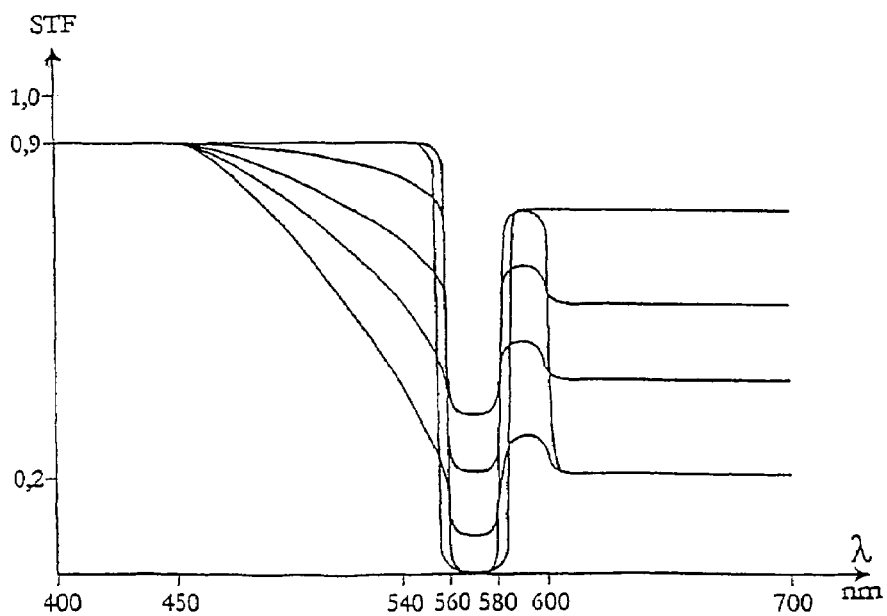
Figure 5C:
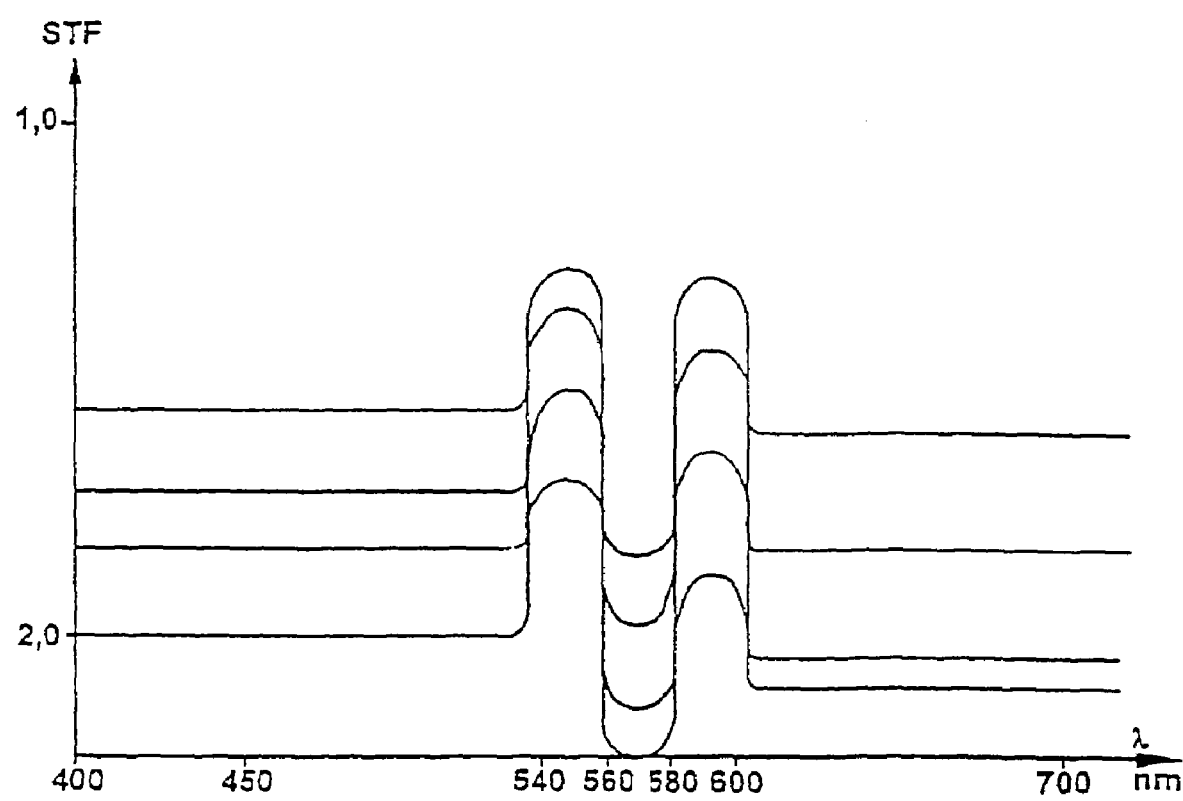

FIG. 5a shows spectral transmission functions designed for patients with protanomaly of varying severities;

FIG. 5b shows spectral transmission functions designed for patients with deuteranomaly of slight to moderate severities;

FIG. 5c shows spectral transmission functions designed for patients with severe deuteranomaly. All of the functions have been designed by replacing the negative range of the function shown on FIG. 4a or 4b, respectively, by zero, normalizing the function to 0.9, and modifying some sections of the resulting primary spectral transmission function.

Figure 3A:
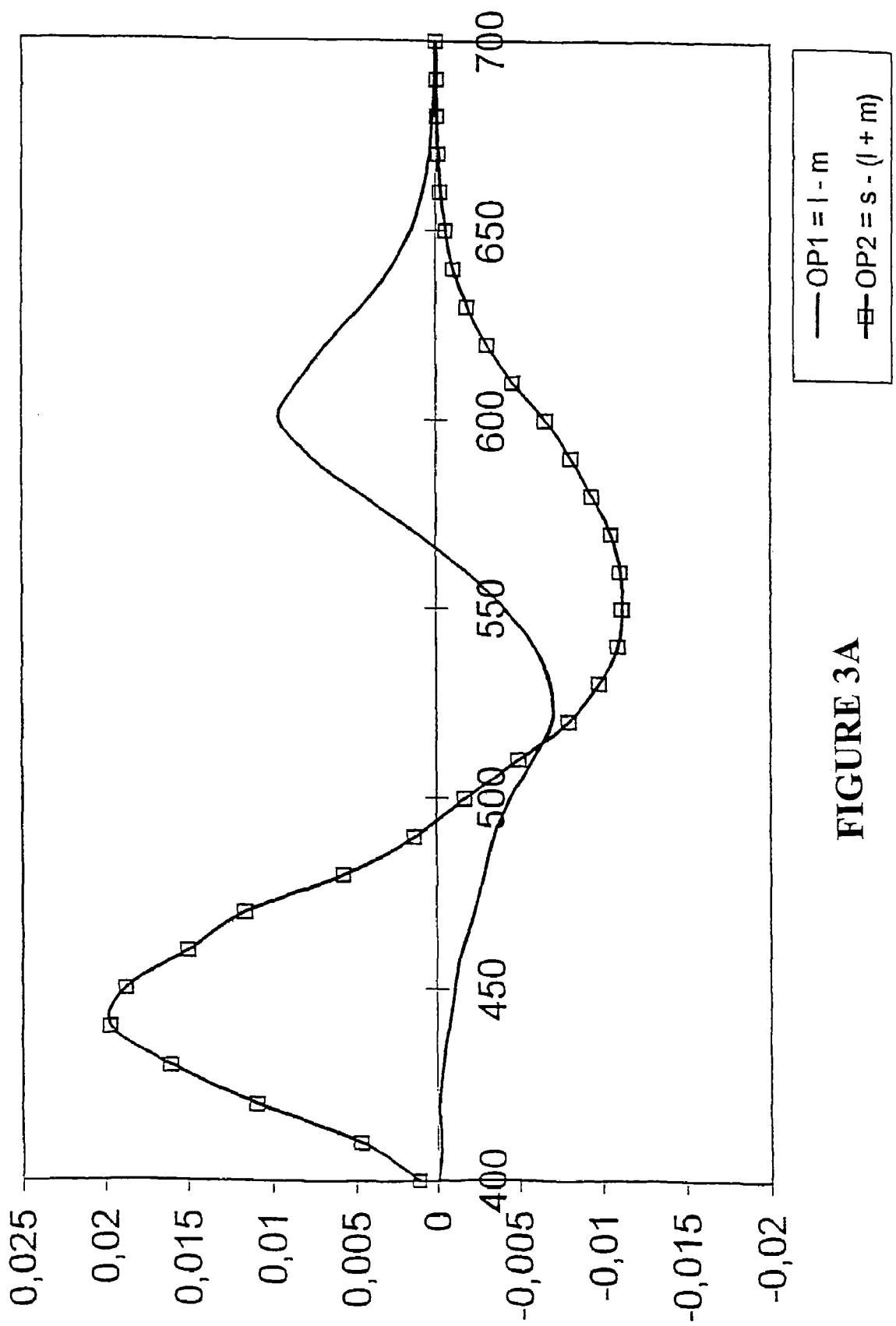
FIG. 3a shows the opponent signal functions (OP$_1$ or OP$_2$) for an eye with normal color vision (abscissa: $\lambda$ in nm, ordinate: intensity); in order to make the graph more expressive, function OP$_1$, has been magnified to about the fivefold in vertical direction.
Figure 3B:
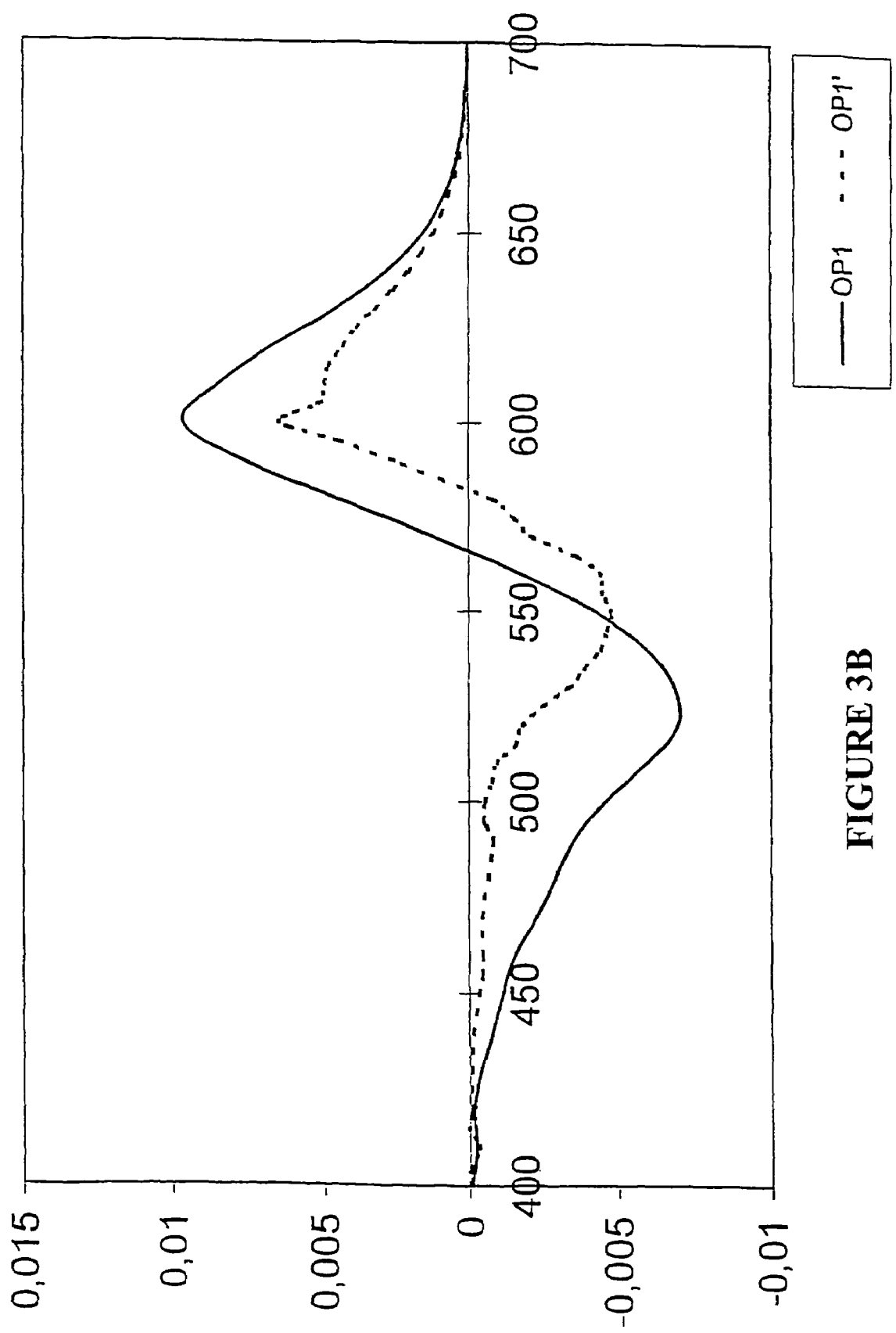
FIG. 3b shows, in the coordinate system according to FIG. 3a, the OP$_1$' function of a patient with typical red/green parachromatism, compared to the OP$_1$, function of an eye with normal color vision.
Figure 6:
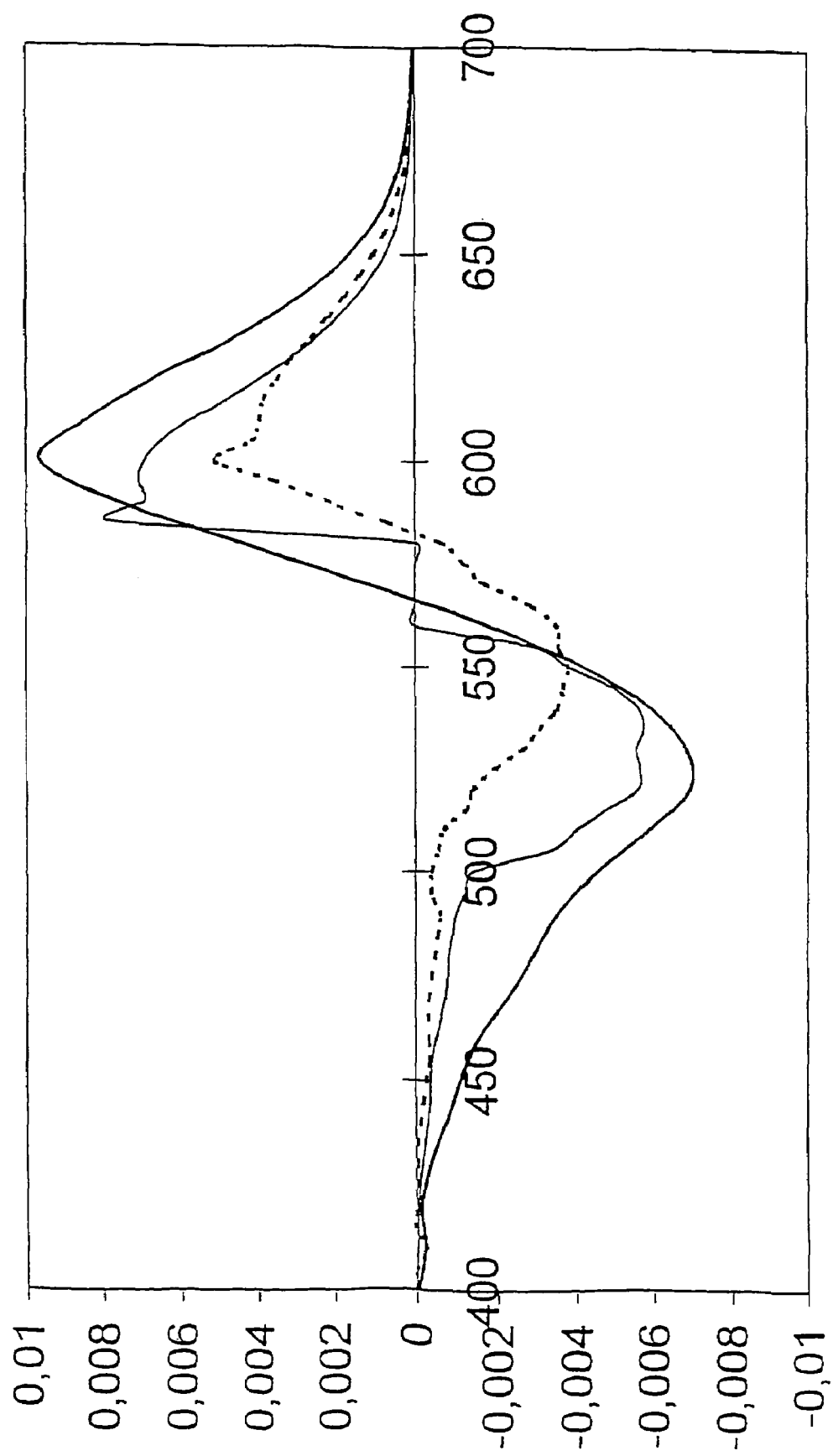

FIG. 6 shows, in the coordinate system as given for FIG. 3a, OP$_1$-type opponent signal functions for a color deficient patient when no means for improving color vision is used (OP$_1$', the curve with dotted line), and when means according to the invention for improving color vision is used (OP$_1$*' the curve with thin full line). For comparison purposes the OP$_1$, curve of an eye with normal color vision (the curve with thick full line) is also given.

Figure 7:
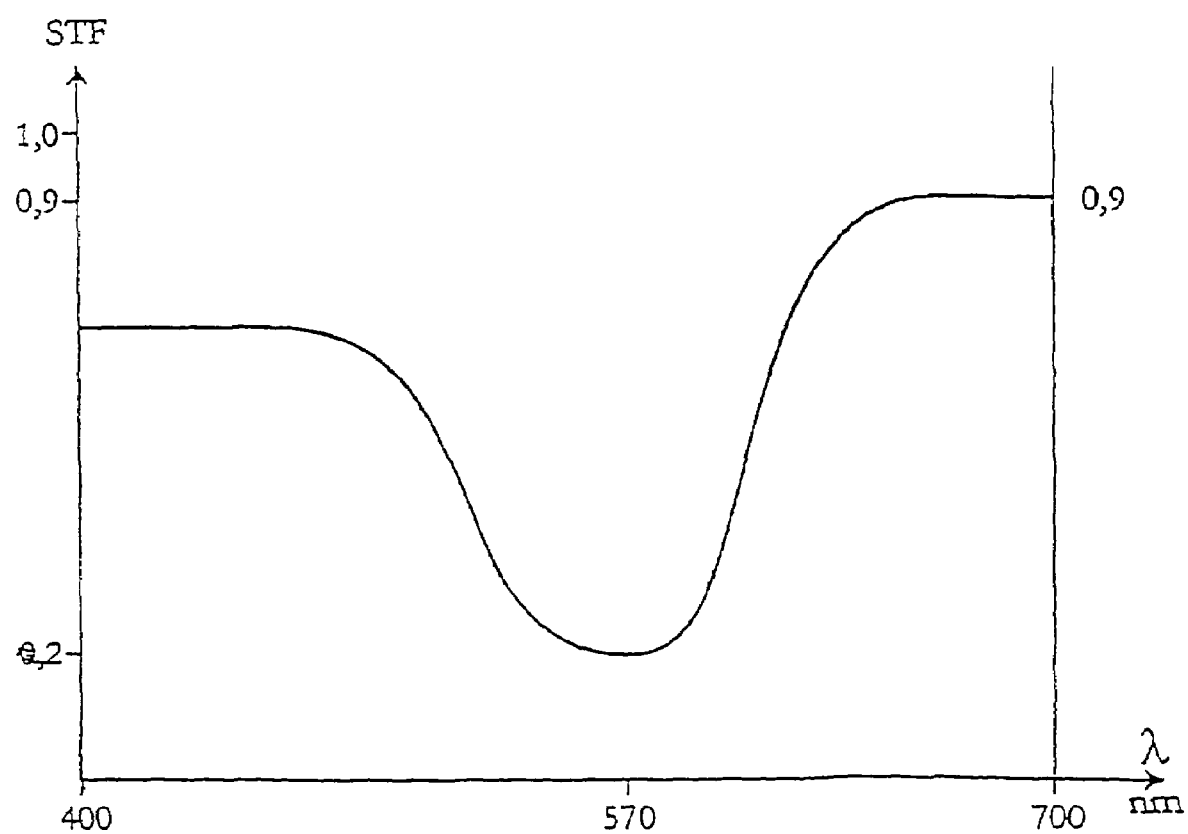
Figure 8:
Figure 9:
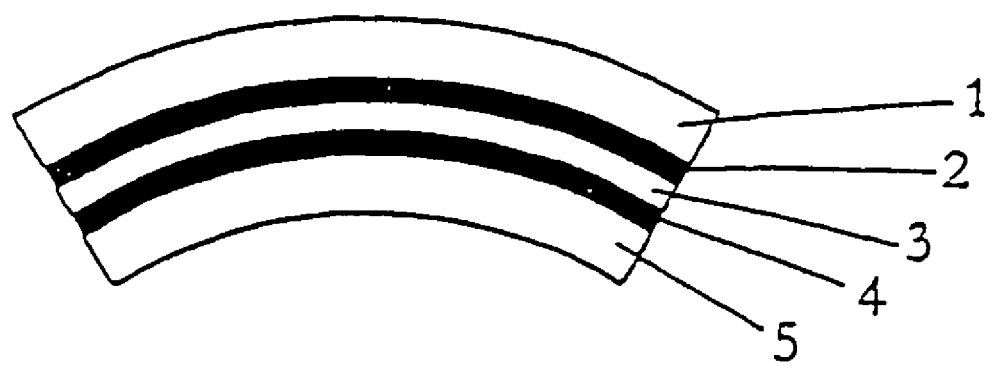
Figure 10:
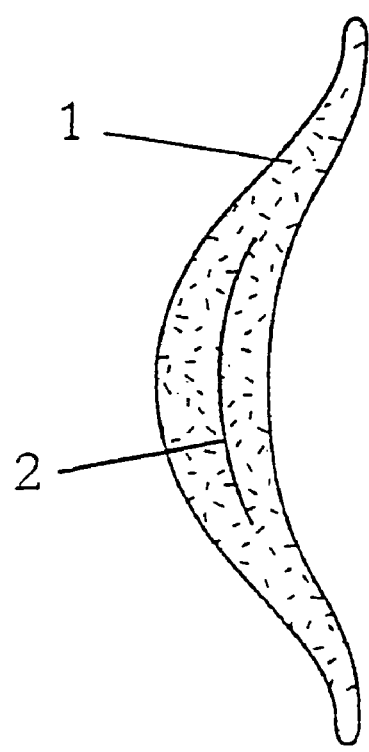
Figure 11:
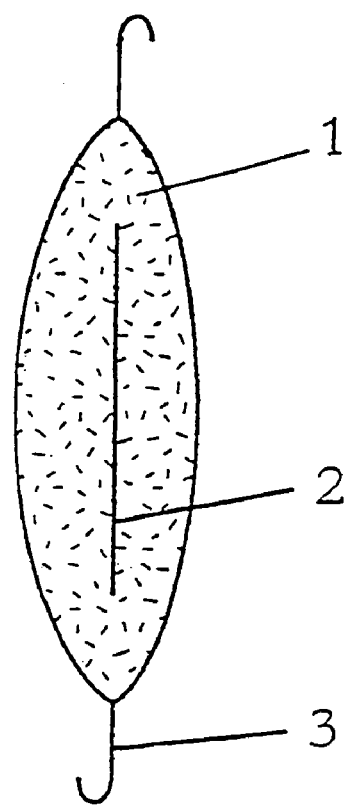

FIG. 7 shows a spectral transmission function of a color filter for improving color brightness and color contrast, designed according to the invention for use on an eye with normal color vision;

FIG. 8 shows a lens for eyeglasses with a color filter layer on one side;

FIG. 9 shows color filter layers situated on overlapping surfaces of two half-lenses, said color filter layers are separated from each other by a transparent optical adhesive;

FIG. 10 shows a contact lens which can be made of colored material (dyed-in lens) or can be provided with color filters; and FIG. 11 shows an intraocular lens which can be made of colored material (dyed-in lens) or can be provided with color filters.

DETAILED DESCRIPTION OF THE INVENTION

A characteristic of patients with red/green parachromatism (i.e. patients with protanomaly or deuteranomaly) is that the SSF of the l photoreceptors (for protanomaly) or the SSF of the m photoreceptors (for deuteranomaly) is in a shifted position and/or has a deformed shape compared to the normal, and the shape of the OP$_1$ function differs from the normal in both instances. Since most of color deficients suffer from red/green parachromatism, the invention will be discussed in the following how normal OP$_1$ can be attained. It should be noted, however, that the same principles apply when normal OP$_2$ should be attained on patients suffering from tritanomaly, where the SSF of the sphotoreceptors is in a shifted position and/or has a deformed shape. The same principles also apply when the color vision of a non color deficient person is to be modified for a specific purpose, i.e. the aim is to attain OP$_1$ or OP$_2$ which differs from the normal in a predetermined manner.

To design the spectral transmission function, the quotient-forming OP$_1$ and OP$_1$' functions should be prepared first, which requires the knowledge of the SSFs of the l, m and s receptors both for an eye with normal color vision and for the eye with a color vision to be improved or modified. For eyes with normal color vision these curves have been published, thus they are known (see Stockmann et al., supra). SSFs characteristic of an eye with anomalous color vision can be determined accurately by known methods (see e.g. U.S. Pat. No. 5,801,808). It has been observed, however, that for eyes with anomalous color vision the accurate knowledge of the SSFs is not an absolute requirement; it is sufficient to take these curves approximately.

When color deficiency can be attributed solely to the shifted positions of SSFs (this is true for the majority of the cases), suitable approximative curves can be constructed e.g. on the basis of anomaloscopy, which is a widely used diagnostic method, and on the basis of which the type and degree of e.g. red/green parachomatism can be classified into the following diagnostic groups:

anomalies caused by the defects of the l receptors: slight protanomaly, moderate protanomaly, severe protanomaly, protanopy;

anomalies caused by the defects of the m receptors: slight deuteranomaly, moderate deuteranomaly, severe deuteranomaly, deuteranopy.

In the knowledge of the above diagnosis the SSF for an anomalous receptor can be derived from the normal one in such a way that the SSF of the respective normal receptor is shifted along the wavelength axis with the following values (negative figures represent a shift towards the shorter wavelength region, whereas positive figures represent a shift towards the longer wavelength region):

for slight protanomaly: −6 nm
for moderate protanomaly: −12 nm
for severe protanomaly: −18 nm
for protanopy: −24 nm
for slight deuteranomaly: +6 nm
for moderate deuteranomaly: +12 nm
for severe deuteranomaly: +18 nm
for deuteranopy: +24 nm The above grades are sufficient, since if once the color vision-improving color filters according to the invention have been prepared as test filters for all of the above grades, the patient can already test functionally whether the test filter which corresponds to his diagnosis or the next one gives better results for him in color vision tests.

Figure 1A:
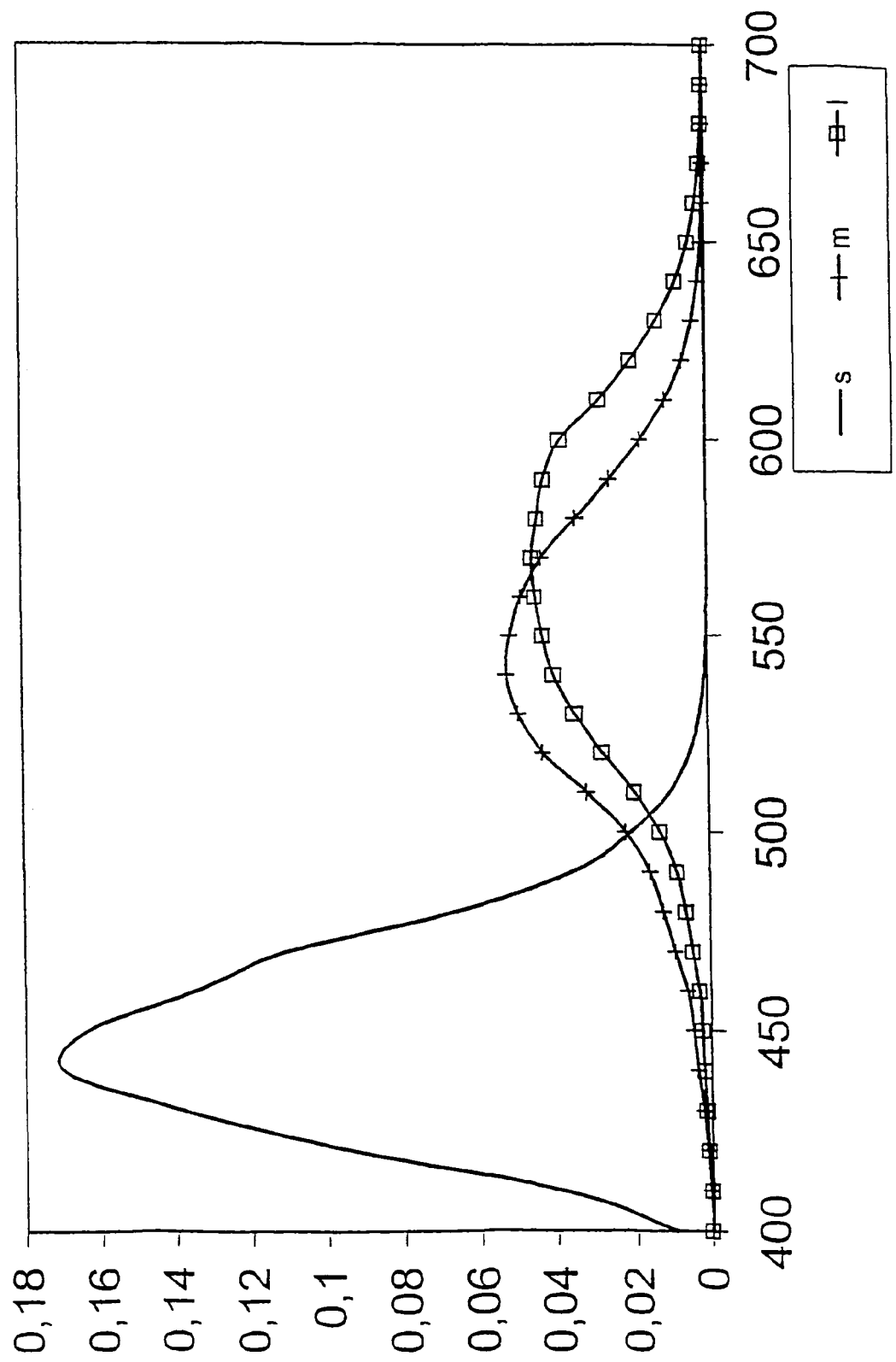
FIG. 1b shows, in the coordinate system according to FIG. 1a, the spectral sensitivity functions of the photoreceptors for a theoretical type of tritanomaly, where the SSF of the s receptors has been indicated with dotted line. For comparison purposes, the correct shape and position of the SSF of the s receptors has also been indicated with full line.
Figure 1B:
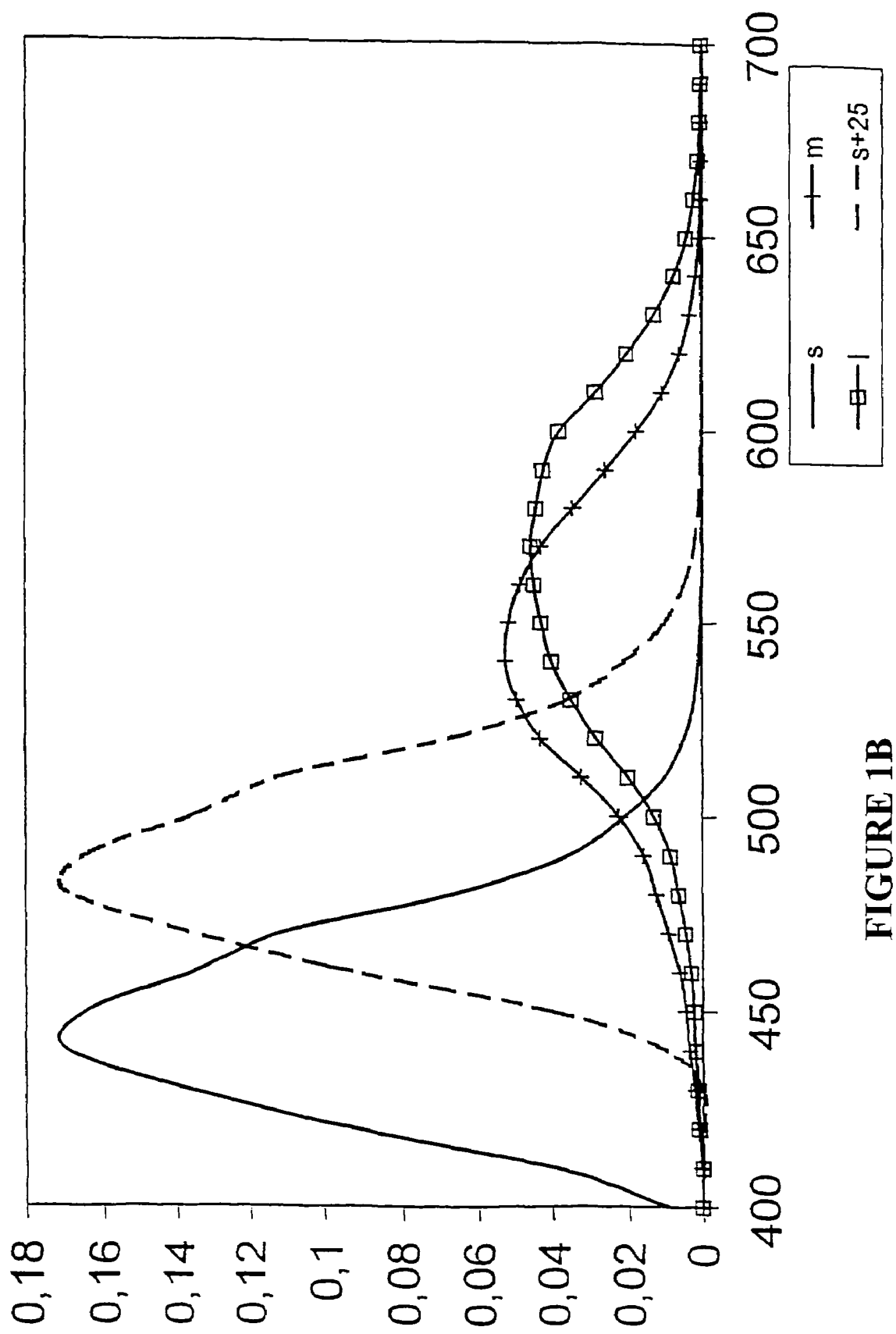
Figure 2:
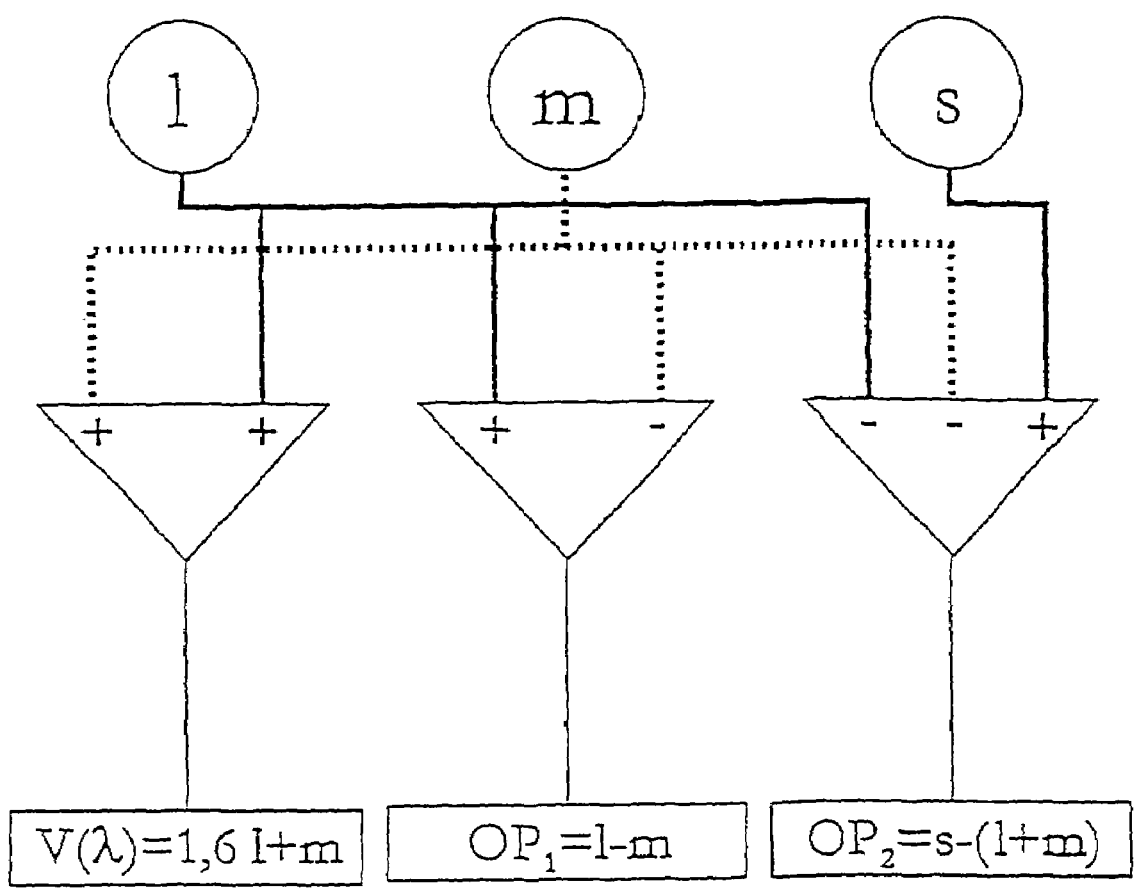
FIG. 2 is a block scheme of the processing of receptor signals on ganglion cell level, and indicate how the OP$_1$, type (red/green) and OP$_2$ type (blue/yellow) opponent signals, which transmit color information to the brain for further processing, are created, and how the achromatic V ($\lambda$) spectral luminousity function is formed.

$OP_1$ and $OP_1'$ can be obtained from the normal SSFs and from the anomal ones, respectively, according to the model shown in FIG. 2. The same holds for $OP_2$ and $OP_1$, too.

Thereafter $OP_1$ is divided by $OP_1'$, which gives a starting function for the final spectral transmission function of the color filter. Such starting functions are shown, in somewhat simplified form, in FIG. 4a for correcting protanomaly and in FIG. 4b for correcting deuteranomaly.

Mathematically the correction of color vision proceeds in such a way that the spectral transmission function of the filter is multiplied by $OP_1'$; thus if the spectral transmission function of the filter is identical with the starting function, the product will be just $OP_1$, i.e. a perfect correction is obtained immediately. This is, however, only a theoretical possibility, due to the following two reasons: The first reason is that the starting function has a negative region (see FIG. 4a), which cannot be realized in practice, since negative filtering does not exist. Thus the negative region of the starting function should be replaced by zero. The second reason is that the light transmission ability of optical means with color filters (e.g. of eyeglasses) cannot exceed 1, even more, due to surface reflections, in practice it never reaches 1, only approximates it to e.g. 92%. Therefore the starting function should be normalized. Normalization is performed preferably to the maximum light transmission percentage of the optical means with color filter. For the examples shown on FIG. 5. the starting function was normalized to 0.9 (i.e. to a light transmission of 90%) in such a way that the function was multiplied over its full length by the quotient of its maximum and 0.9.

Using a color filter with a spectral transmission function designed as discussed above, the modified (i.e. improved) opponent signal function ($OP_1^*$) is generated in the human organism as follows:

In fact, the color filter changes the spectral composition of the input light, which means mathematically that the sensitivity functions of the receptors are multiplied. If, through the color filter, white light enters the eye of the patient with color vision to be improved, the receptors of the eye will adapt to the white light. This can be described mathematically as follows: the SSFs of the l, m and s receptors are multiplied first by the spectral transmission function of the color filter, and then they are multiplied by constants so that the ratios of the integrals of the SSFs of the l, m and s wavelength sensitive receptors return to the original values (1:1:2). This means that the eye recognizes the white color as white even with the color filter (this is termed color adaptation). Upon multiplication by the spectral transmission function of the color filter and adaptation the original SSFs of the receptors are converted to SSF*s. As a result of the processes taking place in the ganglion cells (their model is shown in FIG. 2), a modified opponent signal function ($OP_1^*$) is formed from the SSF*s. Although, due to the two reasons discussed above, this modified $OP_1^*$ cannot be the same as the $OP_1$ to be attained, but, as it can be seen in FIG. 6, it is much more close to the desired function than the starting $OP_1'$.

In some instances it may be desirable to perform further modifications on the modified $OP_1^{*\prime}$ With such modifications it can be influenced that on what sections and to what extent should the modified $OP_1^*$ approximate the target function, i.e. $OP_1'$ Thus it can be decided whether, in order to obtain better results, the shape of $OP_1^*$ or its maximum should be in the closest possible proximity to that of the target curve. It can also be decided whether, to obtain better results, the positive or negative maximum of $OP_1^*$ should coincide in wavelength with the positive or negative maximum of the target curve, or rather the heights of the maxima of $OP_1^*$ should be increased. These modifications are termed in the following as optimization.

When optimization is desired (which may occur e.g. if $OP_2$ should also be improved on a patient treated for $OP_1$ improvement), first the above-discussed processes which take place in the human organism are repeated mathematically, i.e. the starting SSFs of the l, m and s receptors are multiplicated by the spectral transmission function of the color filter, and the ratios of the integrals of the resulting SSFs are readjusted to the starting values of 1:1:2. In this way modified SSF*′ are generated, from which $OP_1^*$ is formed according to the model shown in FIG. 2. The resulting curve ($OP_1^*$) is compared then to the correct curve ($OP_1$)′ and it is decided how and on which section(s) should it be modified. In the next step the spectral transmission function is modified on one or more section(s), and then a second, further-modified $OP_1^*$ is generated as discussed just above, utilizing the modified transmission function. Optimization is regarded as successful when the desired changes appear on this further-modified $OP_1^*$. Optimization is performed preferably in several steps in such a way that the spectral transmission function is divided into sections along the wavelength axis, and only one of these sections is modified in each of the individual steps. Thus e.g. the following parameters of the individual sections can be modified either solely or in combination with one another:
height of the section;
location of one or both endpoints of the section;
slope of the section either over the whole range or over a part thereof.

As an example, it is given below how it is advisable to change certain parameters of the individual sections on a spectral transmission function divided to 6 sections in order to attain better correction of various types of parachromatism. The 6 sections are as follows:
(1) 400-450 nm
(2) 450-540 nm
(3) 540-560 nm
(4) 560-580 nm
(5) 580-600 nm
(6) 600-700 nm Protanomaly:
section (1): height;
section (2): height; location of the endpoint at 540 nm;,
section (3): height; location of the endpoints;
section (4): location of the endpoints;
sections (5)-(5): slope.

Spectral transmission functions obtained by varying such parameters are shown in FIG. 5a.

Deuteranomaly of slight to medium severity:
sections (2)-(3): slope;
section (4): location of the endpoints;
section (5): height; location of the endpoints;
section (6): height.

Spectral transmission functions obtained by varying such parameters are shown in FIG. 5b.

Severe deuteranomaly:
sections (1)-(2): height;
section (3): height; location of the endpoints;
section (4): location of the endpoints;
section (5): height; location of the endpoints;
section (6): height.

Spectral transmission functions obtained by varying such parameters are shown in FIG. 5c.

Tritanomaly:
sections (1)-(2): slope;
sections (3)-(4)-(5)-(6): height.

Some characteristic numerical parameters of spectral transmission functions suitable for the correction of the color vision of patients suffering from red/green parachromatism (protanomaly or deuteranomaly) are given below for the purpose of exemplification:

(a) the spectral transmission function has a monotonously varying subsection which, when protanomaly is to be corrected, falls on the 580-700 nm section and has a slope of $0-7.5 \times 10^{-3}$ nm$^{-1}$, or, when deuteranomaly is to be corrected, falls on the 450-560 nm section and has a slope of $-10^{-2}-0$ nm$^{-1}$;

(b) in the 560-580 nm section the spectral transmission function has a subsection with a light transmission of 0-20%;

(c) the spectral transmission function has a subsection with nearly constant light transmission, said subsection being in the 400-540 nm section when protanomaly is to be corrected, or in the 600-700 nm section and occasionally also in the 400-540 nm section when deuteranomaly is to be corrected; and/or (d) the spectral transmission function has a subsection where the light transmission is greater than that of the preceding or subsequent subsection with nearly constant light transmission ("overshot"), said subsection being in the 540-560 nm section when protanomaly is to be corrected, or in the 580-600 nm section and occasionally also in the 540-560 nm section when deuteranomaly is to be corrected.

As it has already been mentioned, spectral transmission function of a color filter which serves to modify color vision of a normal eye in an aimed manner can also be designed by the above method. In this instance the real opponent signal function characteristic of the eye with color vision to be modified will correspond to the opponent signal function of an eye with normal color vision, whereas the opponent signal function to be attained will be an opponent signal function which deviates from the normal one in accordance with the change to be attained. All of the other steps of the process are the same as given above. A thus-designed spectral transmission function is shown in FIG. 7. The filter with a spectral transmission function as shown in FIG. 7 enables a more contrasted color vision for non color deficients by rendering the hues more vivid. Such color filters are suitable e.g. for those who, as a part of their job, have to identify certain hues with very high accuracy.

Color filters with spectral transmission function designed according to the invention can be made by any technology suitable for color filter production. Examples of some widespread methods for making color filters are discussed below. One of these methods is to prepare vacuum-evaporated color filters of thin layer structure, which is used e.g. in the production of eyeglasses with antireflective layers. Using this technology, which utilizes the interference features of light, filters with practically any designed spectral transmission function can be produced by evaporating materials of different refractive indices onto one another as layers with an optical pathway of $\lambda/4$. Nowadays commercial softwares are also available which enable one to design a layer system providing the desired spectral transmission function. Depending on the materials of the individual layers, a given spectral transmission function can be provided for in various ways.

According to another known method, the required spectral transmission function is formed from ready-made pigments selected from a wide variety of commercially available dyes. These pigments are either mixed into the material of the lens to obtain a dyed-in lens, or are allowed to enter the surface layer of the lens by thermodiffusion methods, or are painted onto the lens surface. This method is simpler than that discussed before, however, the spectral characteristics of the available pigments restrict the choice of spectral transmission functions obtainable by this method. Thus with ready-made pigments the required spectral transmission function can only be approximated, however, such approximations may also be acceptable.

The above two solutions can also be applied in combination. Thus it is possible to combine a dyed-in type filter with a thin layer type one, or to apply a thin layer type filter either onto the painted or thermodiffusion-treated surface of a lens or onto its opposite surface. In such instances the resultant of the spectral transmission functions of the individual color filters will correspond to the spectral transmission function designed, according to the invention.

As a new solution, the spectral transmission function designed according to the invention can also be obtained with a sandwich filter. In this instance two color filters are superimposed to one another with a transparent optical adhesive between them, and the resultant (i.e. the product) of the spectral transmission functions of the two filters will correspond to the spectral transmission function designed according to the invention. This solution, which forms also a part of the invention, can be applied to advantage when it is difficult to prepare the filter with the required spectral transmission function by the known methods.

As it appears from the above, in many instances the color filter is in fact an assembly of color filters combined with one another. Thus, where the specification and claims refer to color filter, this term covers such combinations, too. A dyed-in lens or a lens dyed on its surface layer is also regarded as a color filter.

The invention also relates to optical color filter means which have a color filter with a spectral transmission function designed according to the invention. Some examples of such optical means are shown in FIGS. 8 to 11.

The optical means shown in FIG. 8 is a 1 lens for placing into an eyeglass frame or into a window of an instrument, with a 2 color filter of a spectral transmission function designed according to the invention on its inner surface.

FIG. 9 shows one embodiment of a means comprising the sandwich filter discussed above. Said means comprises a first 1 lens with a first 2 color filter on its inner surface, a second 5 lens with a second 4 color filter on its outer surface, and a 3 optical adhesive which adheres said first 2 color filter to said second 4 color filter. Again, both lenses may be eyeglass lenses or lenses for use as a window of an instrument.

FIG. 10 shows a 1 contact lens with a 2 filter layer in its inside; FIG. 11 shows a 1 intraocular lens provided with 2 filter layer and 3 haptics.

The lens may be zero dioptric or may be prepared with an appropriate dioptric correction as prescribed. The lens may be provided with conventional protecting cover and/or anti-reflection layer; in this latter instance the light transmission of the lens may be as high as 99%.

What we claim is:

1. An optical means comprising a color filter for correcting or modifying color vision of human eye, wherein the color filter has a spectral transmission function designed according to a method comprising:
    dividing a desired opponent signal function to be attained ($OP_1$ or $OP_2$) by a real opponent signal function characteristic of the eye with color vision to be improved or modified ($OP_1'$ or $OP_2'$);
    replacing the negative range of the resulting function by zero; and
    normalizing said resulting function to give a spectral transmission function.

2. An optical means according to claim 1 for correcting color vision of a human eye with protanomaly, wherein the spectral transmission function has at least one characteristic selected from the group consisting of:
    (a) on its section falling within a wavelength range of 580-700 nm a monotonously varying subsection with a slope of $0-7.5\times10^{-3}$ $nm^{-1}$;
    (b) on its section falling within a wavelength range of 560-580 nm a subsection with a light transmission of 0-20%;
    (c) on its section falling within a wavelength range of 400-540 nm a subsection with nearly constant light transmission; and
    (d) on its section falling within a wavelength range of 540-560 nm a subsection where light transmission is greater than that of the preceding subsection with nearly constant light transmission.

3. An optical means according to claim 1 for correcting color vision of a human eye with deuteranomaly, wherein the spectral transmission function has at least one characteristic selected from the group consisting of:
    (a) on its section falling within a wavelength range of 450-560 nm a monotonously varying subsection with a slope of $-10^{-2}-0$ $nm^{-1}$;
    (b) on its section falling within a wavelength range of 560-580 nm a subsection with a light transmission of 0-20%;
    (c) on its section falling within a wavelength range of 600-700 nm and optionally also on its section falling within a wavelength range of 400-540 nm a subsection with nearly constant light transmission; and
    (d) on its section falling within a wavelength range of 580-600 nm and optionally also on its section falling within a wavelength range of 540-560 nm a subsection where light transmission is greater than that of the subsequent subsection with nearly constant light transmission.

4. An optical means according to claim 1, wherein said means is selected from the group consisting of: a lens for placing into an eyeglass frame; a lens for placing into a window of an instrument; a contact lens; and an intraocular lens.

5. An optical means according to claim 1, wherein said color filter is a dyed-in type filter.

6. An optical means according to claim 1, further comprising:
    a first lens with a first color filter on its inner surface;
    a second lens with a second color filter on its outer surface; and
    an optical adhesive layer interconnecting said first color filter with said second color filter,
    wherein a combination of a spectral transmission function of said first color filter and a spectral transmission function of said second color filter corresponds to said spectral transmission function.

7. An optical means according to claim 1, wherein the method for designing the spectral transmission function further comprises:
    generating a modified opponent signal function ($OP_1^*$ or $OP_2^*$) from said spectral transmission function and from real spectral sensitivity functions of l, m and s receptors of the eye with color vision to be improved or modified; and
    modifying one or more section(s) of said spectral transmission function over one or more wavelength range(s) by comparing, in one or more repetitions, said modified opponent signal function ($OP_1^*$ or $OP_2^*$) with said desired opponent signal function to be attained ($OP_1$ or $OP_2$).

8. An optical means according to claim 1, wherein said color filter is provided on a surface of said optical means.

9. A method for designing spectral transmission function for a color filter which improves or modifies color vision of human eye, comprising:
    dividing a desired opponent signal function to be attained ($OP_1$ or $OP_2$) by a real opponent signal function characteristic of the eye with color vision to be improved or modified ($OP_1'$ or $OP_2'$);
    replacing the negative range of the resulting function by zero; and
    normalizing said resulting function to give a spectral transmission function.

10. A method according to claim 9, further comprising performing normalization for the maximum light transmission percentage of an optical means to be provided with said color filter.

11. A method according to claim 9, wherein said color filter corrects color vision of a human eye with red/green parachromatism, and wherein $OP_1$ characteristic of an eye with normal color vision is used as said opponent signal function to be attained, and $OP_1'$ is generated as the difference from the real spectral sensitivity functions of the human eye's l and m receptors, and is used as said real opponent signal function.

12. A method according to claim 11, wherein said human eye has protanomaly and wherein the spectral transmission function is modified by at least one step selected from the group consisting of:
    varying the height of the function and/or the location of the endpoint at 540 nm on its section falling within a wavelength range of 400-540 nm;
    varying the height of the function end/or the location of one or both endpoints on its section falling within a wavelength range of 540-560 nm;
    varying the location of one or both endpoints on its section falling within a wavelength range of 560-580 nm; and
    varying the slope of the function on its section falling within a wavelength range of 580-700 nm.

13. A method according to claim 11, wherein said human eye has deuteranomaly and wherein the spectral transmission function is modified by at least one step selected from the group consisting of:
- varying the slope of the function on its section falling within a wavelength range of 450-560 nm;
- varying the location of one or both endpoints on its section falling within a wavelength range of 560-580 nm;
- varying the height of the function and/or the location of one or both endpoints on its section falling within a wavelength range of 580-600 nm; and
- varying the height of the function on its section falling within a wavelength range of 600-700 nm.

14. A method according to claim 11, wherein said human eye has severe deuteranomaly and wherein the spectral transmission function is modified by at least one step selected from the group consisting of:
- varying the height of the function on its section falling within a wavelength range of 400-540 nm;
- varying the height of the function and/or the location of one or both endpoints on its section falling within a wavelength range of 540-560 nm;
- varying the location of one or both endpoints on its section falling within a wavelength range of 560-580 nm;
- varying the height of the function and/or the location of one or both endpoints on its section falling within a wavelength range of 580-600 nm; and
- varying the height of the function on its section falling within a wavelength range of 600-700 nm.

15. A method according to claim 9, wherein said color filter corrects color vision of a human eye with tritanomaly, and wherein $OP_2$ characteristic of an eye with normal color vision is used as said opponent signal function to be attained, and $OP_2'$ is generated as an $(s-(l+m))$ difference from the real spectral sensitivity functions of the human eye's l, m and s receptors, and is used as said real opponent signal function.

16. A method according to claim 15, wherein said human eye has tritanomaly and wherein the spectral transmission function is modified by at least one step selected from the group consisting of:
- varying the slope of the function on its section falling within a wavelength range of 450-540 nm; and
- varying the height of the function on its section falling within a wavelength range of 540-700 nm.

17. A method according to claim 9, wherein said color filter provides a desired modification of color vision of a normal eye, and wherein an opponent signal function characteristic of normal color vision is used as said real opponent signal function, and an opponent signal function obtained by the desired modification(s) from the opponent signal function characteristic of normal color vision is used as said opponent signal function to be attained.

18. A method according to claim 9, further comprising:
- generating a modified opponent signal function ($OP_1^*$ or $OP_2^*$) from said spectral transmission function and from real spectral sensitivity functions of l, m and s receptors of the eye with color vision to be improved or modified; and
- modifying one or more section(s) of said spectral transmission function over one or more wavelength range(s) by comparing, in one or more repetitions, said modified opponent signal function ($OP_1^*$ or $OP_2^*$) with said desired opponent signal function to be attained ($OP_1$ or $OP_2$).

* * * * *